United States Patent [19]

Wydro, Sr.

[11] 4,380,518
[45] Apr. 19, 1983

[54] METHOD OF PRODUCING SOLDER SPHERES

[75] Inventor: Richard A. Wydro, Sr., Hamilton Township, Mercer County, N.J.

[73] Assignee: Western Electric Company, Inc., New York, N.Y.

[21] Appl. No.: 337,049

[22] Filed: Jan. 4, 1982

[51] Int. Cl.³ ............................................. B01J 2/06
[52] U.S. Cl. ........................................ 264/13; 264/15
[58] Field of Search .................................. 264/13, 15

[56] References Cited

U.S. PATENT DOCUMENTS

| | | | |
|---|---|---|---|
| 616,161 | 12/1898 | Taliaferro | 75/85 |
| 2,574,357 | 11/1951 | Stammer et al. | 264/13 |
| 3,063,099 | 11/1962 | Turner et al. | 264/15 |
| 3,736,653 | 6/1973 | Maierson et al. | 29/496 |
| 3,748,070 | 7/1973 | Altenhasslau | 425/6 |
| 4,042,374 | 8/1977 | Rasmussen et al. | 264/15 |
| 4,076,637 | 2/1978 | Hurst | 264/15 |
| 4,092,182 | 5/1978 | Arbib et al. | 148/23 |
| 4,168,996 | 9/1979 | Zado | 148/23 |

*Primary Examiner*—James R. Hall
*Attorney, Agent, or Firm*—D. J. Kirk; A. M. Tobia

[57] ABSTRACT

A method of making solder spheres having non-oxidized surfaces by introducing solder into a flux composition comprising an activator and an antioxidant. Molten solder (12) is extruded into a flux composition (24) maintained at ambient temperature or solder powder (40) is sifted into hot flux (46) and then cooled.

14 Claims, 8 Drawing Figures

:::page-number
4,380,518
:::

METHOD OF PRODUCING SOLDER SPHERES

TECHNICAL FIELD

The invention relates to a method of producing solder spheres.

BACKGROUND OF THE INVENTION

It is known that metal particles of random shape and size can be formed by spraying the metal of interest in molten state into the upper part of a spray tower, by dropping molten metal onto a cooler surface, and by pouring a stream of molten metal into a bath of chilling liquid. These methods are satisfactory for the purposes for which they are intended, that is, for example, to produce metal particles suitable for grinding into powder for use in powder metallurgy, and to produce metal shot, such as lead shot. However, the products made by these known methods until the present invention have been of limited utility for use in soldering complex electronic components.

In soldering complex electronic components the solder particles used preferably have clean non-oxidized surfaces and are true spheres. For example, in soldering electronic devices such as chip carriers, preforms are put on the device and then reflowed. In order to assure the formation of reliable solder joints it is important that the preforms be spherical, uniform in size, clean and have a non-oxidized surface.

Until the present invention, such spheres were obtained by a very expensive process wherein solder discs were first stamped out of a solder plate and then reflowed in an inert atmosphere.

SUMMARY OF THE INVENTION

It has been found that metals having a low melting point, such as alloys suitable for use as solder, can be produced cheaply and abundantly in the form of clean, nonoxidized spheres of substantially uniform shape and size, by the inexpensive and easily conducted method of introducing the metal into a flux composition comprising an activator and an antioxidant, the state of the metal and the respective temperatures of the metal and flux being such that spheres of the metal are formed when the metal is introduced into the flux.

DETAILED DESCRIPTION

In the preferred embodiment of the invention, a metal such as solder is made molten and then extruded into a liquid flux composition maintained at ambient temperature. Uniformly shaped and sized spheres having non-oxidized smooth surfaces are formed.

Figure 1:
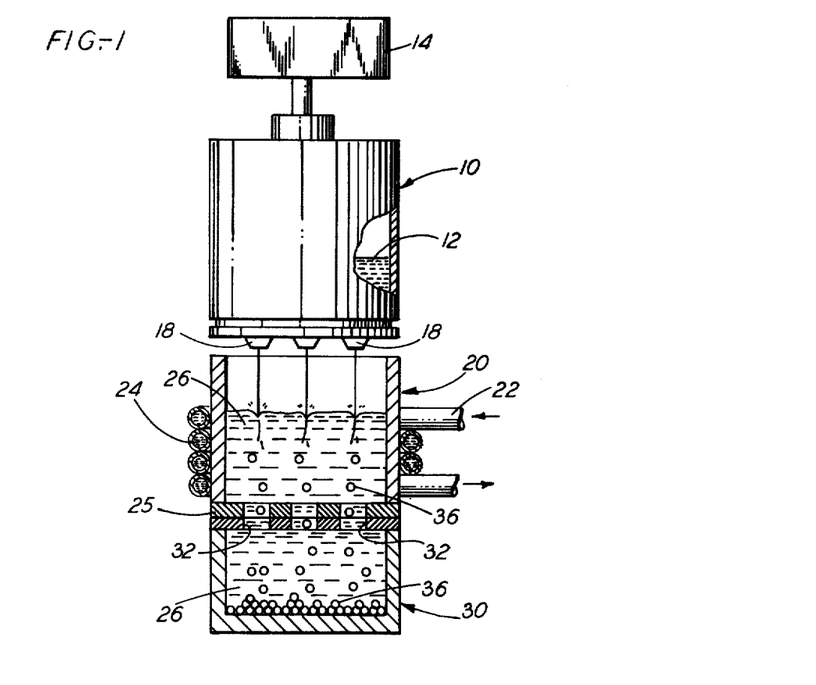
FIG. 1 is a partial cross-sectional, elevational view of an apparatus suitable for use in producing solder spheres.

An apparatus for producing metal spheres in accordance with the preferred embodiment of the invention is shown in FIG. 1; however, it should be appreciated that the apparatus shown is merely illustrative and that any apparatus in which a low melting temperature metal can be made molten and then introduced into a flux composition is suitable for use herein. Additionally, although the invention will be described in connection with the production of solder spheres, it shoud be appreciated that the invention is not so limited and may be used to produce spheres of any low melting point metal or metal alloy. Spheres of size 100μ to 2 mm can be prepared by this method.

The apparatus comprises a chamber 10 for melting and holding the low melting temperature metal 12. Pressurized air may be introduced into the chamber 10 from a source 14. The bottom of the chamber 10 is provided with a plurality of nozzles 18,18 through which the molten metal may be expressed. The nozzles 18,18 are above and spaced from the top of a receptacle 20 for containing a liquid flux composition 26. Cooling coils 22, through which a coolant 24 circulates, surround the receptacle 20 so that the temperature of the liquid flux composition 26 is kept at a desired temperature lower than that of the molten metal. The base 25 of the receptacle 20 and a removable collection basin 30 attached thereto are interconnected by a plurality of valves 32,32.

In operation, a low melting temperature metal 12, such as solder, having a 60 percent tin (Sn) and 40 percent lead (Pb) content, is heated in the chamber 10 and is forced by air pressure supplied from the source 14, out of the nozzles 18,18, in a uniform laminar flow, and into the receptacle 20 containing the liquid flux composition 26. As the metal 12 contacts the relatively cool flux composition 26, metal spheres 36 begin to form. The size of the resulting metal spheres 36 is a function of the diameter of the nozzles 18,18. For solder, the relationship is for every one unit of nozzle diameter, a sphere of approximately 2.7 units of diameter results. It should be noted that the distance of the nozzles 18,18 from the top of the chamber 20 is not critical as long as it is not so great as to cause any substantial divergence of the individual molten streams issuing from the nozzles 18,18. The temperature of the flux is not critical as long as it is cooler than that of the melting point of the metal. Typically, in the case of solder of 60 percent Sn and 40 percent Pb which has a melting point of 362° F., the flux temperature is maintained at approximately 70° F.

The spheres 36 formed in the receptacle 20 pass through valves 32,32 into the removable collection basin 30 where they accumulate. When the basin 30 is full, the valves 32,32 interconnecting the receptacle 20 and basin 30 are closed so that sphere production is not interrupted while the basin is removed and the spheres 36 collected.

The spheres 36 can be washed and stored in airtight containers or stored in containers having the flux composition therein until ready for use. If more uniformly sized spheres are required than the collected size range, the collected spheres can be sifted through various sieves until the degree of uniformity necessary is attained; however, the distribution of sphere sizes, as collected, is fairly uniform.

Figure 2:
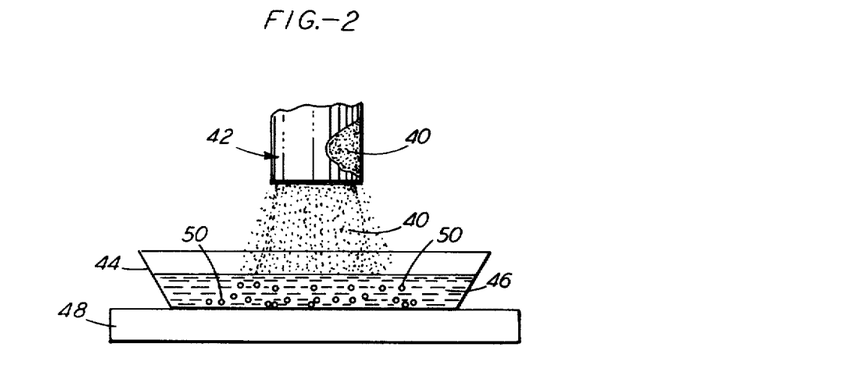
FIG. 2 is a cross-sectional view of an alternative apparatus suitable for use in producing solder spheres.

Referring to FIG. 2, in an alternative embodiment of the invention, powdered metal 40, such as solder powder or dross (oxidized solder powder) is sifted from a container 42 into a shallow pan 44 containing a flux composition 46. The flux composition 46 is maintained at a temperature greater than the melting temperature of the metal by a heater 48. Typically, in the case of solder of 60 percent Sn and 40 percent Pb the temperature is maintained at about 500° F. As the metal 40 contacts the hot flux 46, spheres 50 form. After a batch of predetermined quantity is introduced, the flux 46 is cooled (by means not shown) so that the spheres 50 solidify.

These spheres are collected, washed and stored in a suitable manner. The size of the spheres varies directly with the mesh size of the powder and, accordingly, if the powder is sized before introduction into the hot flux, the size distribution of the resulting spheres is narrow. Spheres can be formed ranging in size from a few microns to several millimeters. Advantageously, this latter embodiment of the invention is best used for forming smaller sized spheres.

In accordance with the invention, the liquid flux composition as used herein comprises an activator and an antioxidant. The activator as it contacts the molten metal provides the chemical activity on the metal surface necessary to combine with inorganic contaminants thereon and dissolve or reduce these so that the surface-free energy of the liquid metal is minimized and spherical drops form. The presence of the antioxidant prevents the formation of an oxidized layer on these spherical drops as they cool.

Typical antioxidants include glycerin, rosin, an ester of a polyhydric alcohol and an organic acid, polyols, glycols and polyglycols.

The rosin used is a natural rosin such as water white rosin (WW rosin). Chemically, water white rosin is a mixture of several compounds. While the specific composition of the individual rosin utilized will vary depending upon the raw material source, the effectiveness of the rosin according to this invention varies only with the rosin's effect on preventing oxidation of the metal surface.

In addition to water white rosins, other rosins, such as hydrogenated wood rosin, and disproportionated wood rosin, etc., well known in the art, can be employed.

Typical esters suitable as antioxidants are those derived frm polyhydric alcohols containing from 2 to 8, preferably 3 to 6, hydroxyl groups, for example, pentaerythritol tetraacetate, pentaerythritol tetrastearate, pentaerythritol tetraoleate, pentaerythritol tetrabenzoate, mannitol hexa-acetate, triethylene glycol dibenzoate, glyceryl tribenzoate, neopentyl glycol dibenzoate, trimethylolethane tribenzoate and sucrose octa-acetate.

To enhance the antioxidation effect, the ester can be used in combination with an organic acid such as an aliphatic or aromatic mono- or polycarboxylic acid, for example, adipic acid, sebacic acid, linoleic acid, benzoic acid or salicyclic acid.

Most activators are suitable for use in the present invention. Activators may be chosen from organic acids such as those referred to above, sulphonic acids, for example, dinonyl naphthalene sulphonic acid, and aliphatic and aromatic amines and hydrohalides thereof, for example, glycine, octadecylamine, nicotinic acid, cyclohexylamine hydrochloride, 2-chloroethyl-morpholine hydrochloride, diethylamine hydrochloride, triethylamine hydrobromide and aniline hydrochloride.

It has been found that the strong acid activators such as HCl and amine hydrochlorides are less preferred since they result in spherical particles having pitted surfaces.

Although introduction of the metal into a combination of activator and solvent alone results in some spherical particles being formed, the surfaces of these particles are oxidized; thereby making the spheres unsuitable for use in the electronics industry. In general, the quality of the resulting spheres is consistently better when a combination of both an activator and an antioxidant is used.

The antioxidant and activator are typically contained in a suitable vehicle, e.g., a solvent carrier, to form a liquid flux composition. For example, the combination comprises a mixture of about 5–50 weight percent antioxidant and about 0.3 to 7 weight percent activator, the remainder being a suitable solvent. The term "weight percent" as used herein means weight of a component per solution expressed as a percentage.

A suitable solvent includes any carrier which is chemically inert with the antioxidant and activator and in which a liquid results. The particular vehicle used is dependent on the activator and antioxidant comprising the flux composition. Some suitable solvents include aliphatic alcohols, e.g, methanol, ethanol, isopropanol, 2-butoxyethanol, amyl alcohols, etc.; alkanolamines, e.g., ethanolamine, diethanolamine; chlorinated hydrocarbons, e.g., perchloroethylene, trichloroethylene; ketones, for example, methyl isobutyl ketone and acetone, and aromatic solvents, e.g., toluene and xylene. Where a non-flammable liquid flux composition is required, the solvent employed is a non-flammable solvent such as a chlorinated hydrocarbon, e.g., perchloroethylene, trichloroethylene.

The combination of activator and antioxidant present in various commercial preparations of solder flux have been found sufficient for the formation of spherical particles in accordance with the teachings of the present inventon. For example, the following commercial flux compositions, all of which include antioxidants and activators have been found to be satisfactory: Alpha Metals #850 (manufactured by Alpha Metals Corp., Jersey City, NJ); Multicore's Xersin 2010 (manufactured by Multicore Solders Inc., Hemel Hempstead, England); and Nassau Smelting's R211 (manufactured by Western Electric Company, Inc., Gaston, SC).

It has been found that Xersin 2010 is especially suitable for use in preparing the uniformly sized smaller spheres obtained when the powdered metal is introduced into the hot flux since the Xersin 2010 is tacky when heated, therefore the metal spheres do not coalesce before cooling.

The flux compositions described in U.S. Pat. Nos. 4,168,996 and 4,092,182, which are incorporated by reference herein, are also useful to form uniform spherical particles having non-oxidized smooth surfaces.

FIGS. 3–6 illustrate the results of extruding molten solder alloy having a 60 weight percent Sn—40 weight percent lead content into various liquids in accordance with the invention. The temperature of the liquid was kept at 70° F.

Figure 3:
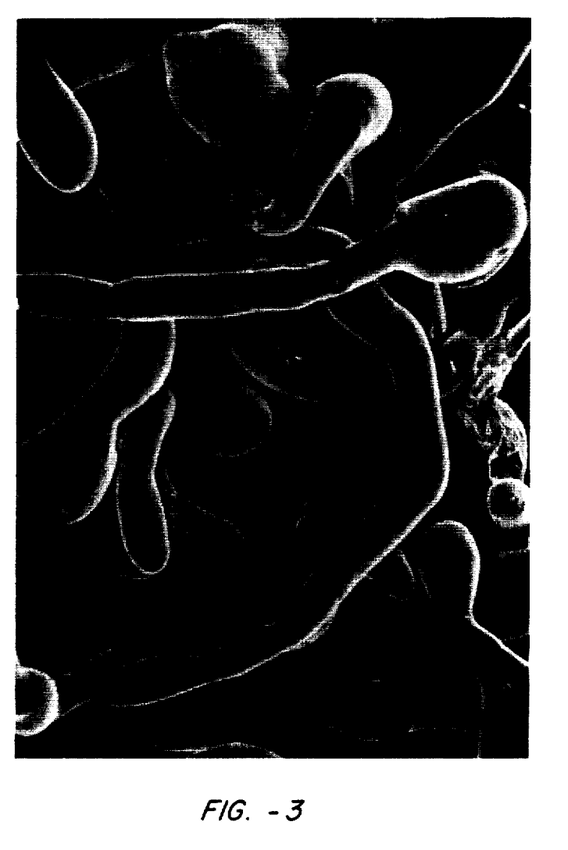
FIG. 3 is a photograph (500X magnification) of solder particles formed when molten solder is extruded into 100% isopropanol.

As a control, FIG. 3 shows the particles which form when only isopropanol, a solvent, is used. Clearly the particles are not spherical.

Figure 4:
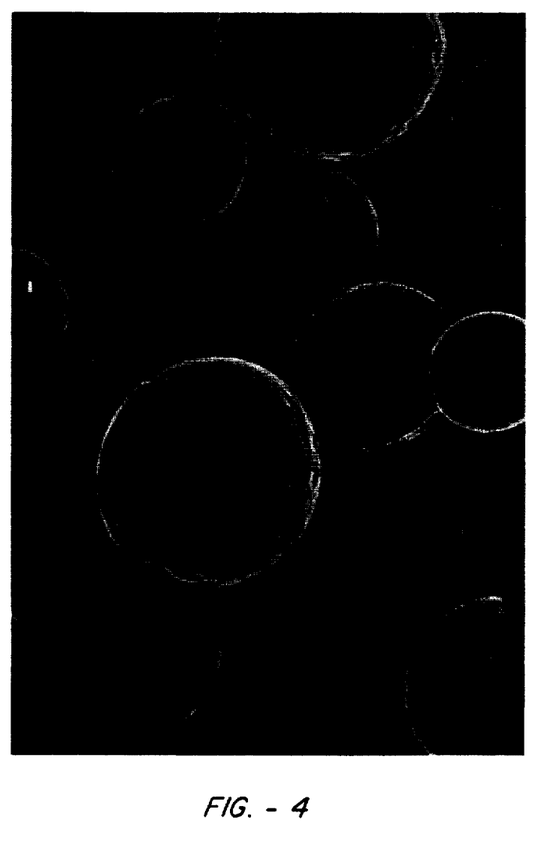
FIG. 4 is a photograph (500X magnification) of solder particles formed when molten solder is extruded into 99 percent isopropanol and 1 percent HCl.

For comparison, FIG. 4 shows the particles which form when one percent HCl, an activator, is added to isopropanol. Uniformly shaped spheres form but they are pitted and, although not apparent from the figure, they are highly oxidized.

Figure 5:
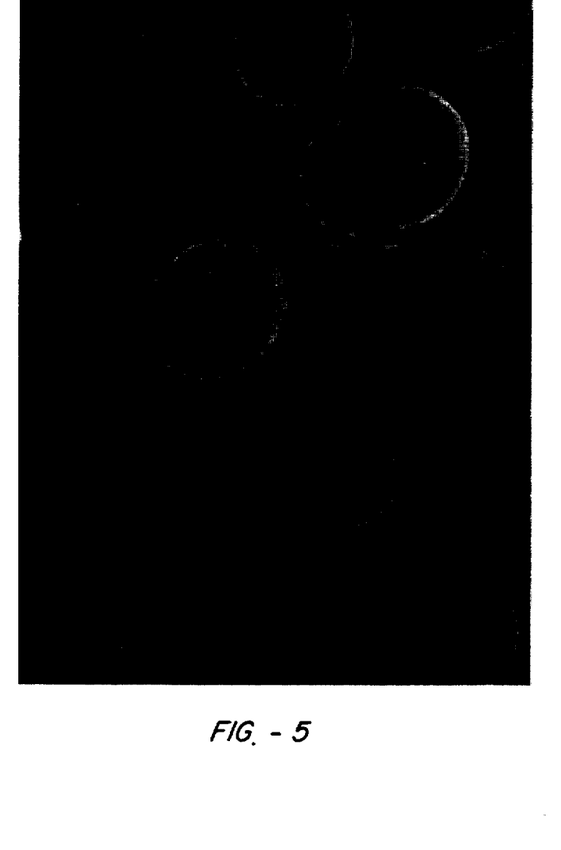
FIG. 5 is a photograph (500X magnification) of solder particles formed when molten solder is extruded into a water soluble flux.

FIG. 5 shows the particles which form when molten solder is introduced into a commercial water soluble flux formulation such as Alpha Metals' flux #850 which comprises a proprietary mixture of a polyglycol type activator and an antioxidant in accordance with the invention.

Figure 6:
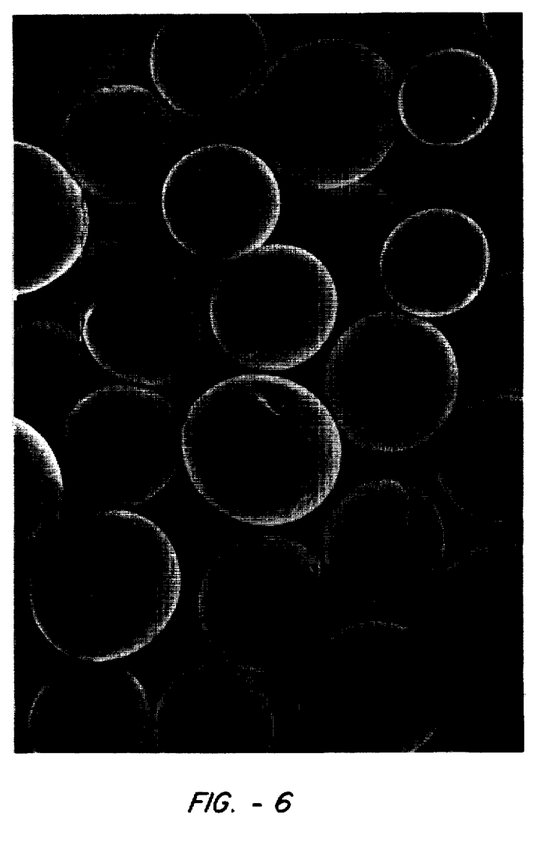
FIG. 6 is a photograph (500X magnification) of solder particles formed when molten solder is extruded into a non-rosin flux.

FIG. 6 shows the particles which form when the molten solder is introduced into a non-rosin flux such as Multicore's Xersin 2010 which comprises a proprietary mixture of an activator and pentaerythritol tetrabenzoate as an antioxidant in accordance with the invention.

As can be seen from FIGS. 5 and 6, uniformly shaped spheres having smooth surfaces form only when molten solder is introduced into a flux containing both an activator and an antioxidant. Further, as can be seen in FIGS. 3 and 4, respectively, when solvent alone is used no spheres formed; when a strong activator such as HCl is used in combination with solvent, spheres form, but they are highly oxidized and pitted.

When molten solder is extruded into an antioxidant such as rosin and isopropanol without an activator, the resulting particles are long and stringy, looking very much like the particles shown in FIG. 3, wherein molten solder was extruded into solvent alone.

Figure 7:
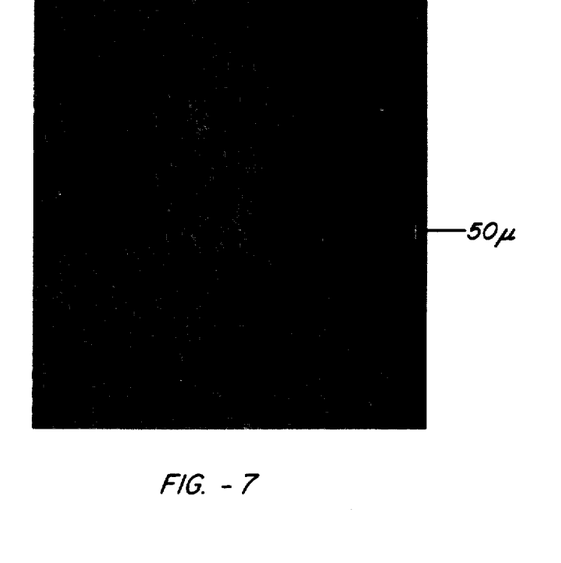
FIG. 7 is a photograph (30X magnification) of spheres formed by sifting solder powder into a non-rosin flux.
Figure 8:
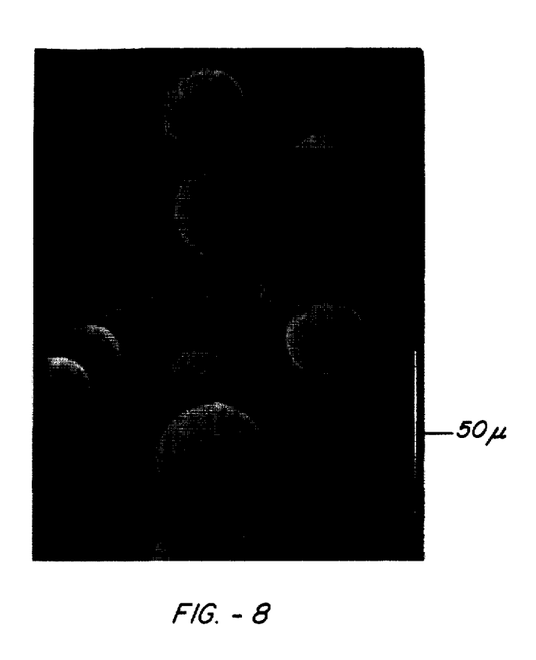
FIG. 8 is a photograph of the same spheres shown in FIG. 7 at 500X magnification.

FIGS. 7 and 8 illustrate the results of sifting powdered solder, mesh size 200, with particles less than 0.003 mil diameter, into Multicore's Xersin 2010, a non-rosin flux comprising an activator such as pentaerythritol benzoate and an antioxidant in accordance with the invention.

Both FIGS. 7 and 8 show spherical shaped particles. The spheres have smooth non-oxidized surfaces.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A method of making metal spheres having non-oxidized surfaces, comprising:
   introducing a metal having a low melting temperature into a liquid flux comprising an activator and an antioxidant, the flux being maintained at a temperature so as to cause metal spheres to form, the state of the metal and the respective temperature of the metal and flux being such that spheres of the metal are formed when the metal is introduced into the flux.

2. The method as recited in claim 1, wherein the metal is a solder alloy.

3. The method as recited in claim 1, wherein the activator is an organic acid.

4. The method as recited in claim 1, wherein the antioxidant is selected from the group consisting of a rosin, glycerin, an ester derived from a polyhydric alcohol and an organic acid, a polyol, a polyglycol and a glycol.

5. The method recited in claim 1, wherein the flux further comprises a solvent.

6. The method recited in claim 1, wherein the metal is made molten prior to introduction into the flux and the flux is maintained at a temperature lower than the melting temperature of the metal.

7. The method as recited in claim 1, wherein the metal is in particulate form and the flux is heated to at least the melting point of the metal.

8. A method of making solder spheres comprising the steps of:
   (a) heating the solder until it is molten,
   (b) introducing the molten solder into a liquid flux comprising an activator and an antioxidant, said liquid flux being at a temperature so as to cause the metal to solidify into spheres.

9. The method recited in claim 8, wherein the antioxidant is rosin.

10. The method recited in claim 8, wherein the antioxidant is an ester derived from a polyhydric alcohol having from 2 to 8 hydroxyl groups and an organic acid.

11. The method recited in claim 10, wherein the ester is pentaerythritol benzoate.

12. A method of making solder spheres comprising the steps of sifting powdered solder into a liquid flux composition comprising an activator and an antioxidant, said liquid flux composition being maintained at a temperature greater than the melting temperature of the solder.

13. The method recited in claim 12, wherein the antioxidant is an ester derived from a polyhydric alcohol having from 2 to 8 hydroxyl groups and an organic acid.

14. The method recited in claim 13, wherein the ester is pentaerythritol benzoate.

* * * * *